Jan. 2, 1945. S. J. POVER 2,366,213
INTERNAL-COMBUSTION MOTOR
Filed Aug. 28, 1942 3 Sheets-Sheet 1

Witness
Herbert E. Covey

Inventor
Stanley J. Pover
By Clayton L. Jenks
Attorney

Jan. 2, 1945.　　　　　S. J. POVER　　　　2,366,213
INTERNAL-COMBUSTION MOTOR
Filed Aug. 28, 1942　　　3 Sheets-Sheet 3

Inventor
Stanley J. Pover
By Clayton L. Jenks
Attorney

Witness
Herbert E. Covey

Patented Jan. 2, 1945

2,366,213

UNITED STATES PATENT OFFICE 2,366,213

INTERNAL-COMBUSTION MOTOR

Stanley J. Pover, Denver, Colo., assignor to William E. Hughes, Lafayette M. Hughes, Jr., and Charles J. Hughes Application August 28, 1942, Serial No. 456,470

6 Claims. (Cl. 123—14)

This invention relates to internal combustion motors and more particularly to a motor in which a rotor is rotated continuously in one direction by a succession of explosion impulses applied intermittently thereagainst.

The primary object of this invention is to provide a uni-directional, continuously rotating, internal combustion motor which will operate efficiently and economically.

A further object of this invention is to provide a construction in which both the rotor and the stator may be fluid cooled.

A further object is to provide a construction of this type in which the movable abutments which define the end walls of the compression and the explosion chambers may be properly moved with a minimum of friction and without interfering materially with the operation of the motor.

A further object of the invention is to provide a motor of this type which has such as arrangement and construction of rotor, stator and abutment parts that a combustible gas may be sequentially compressed by one set of lobes on the rotor and then exploded against another set of lobes, and wherein the gas is transferred from a compression to an explosion chamber, while remaining in place between the rotor and stator and the associated abutments, so as to avoid using by-passes and controlling valves.

A further object of the invention is to provide a valveless motor of this type in which the flow of gas to and from the motor chambers is controlled only by the requirements of the operating rotor and stator parts. Further objects will be apparent in the following disclosure.

Referring to the drawings, which illustrate a preferred embodiment of this invention:

Figure 1:
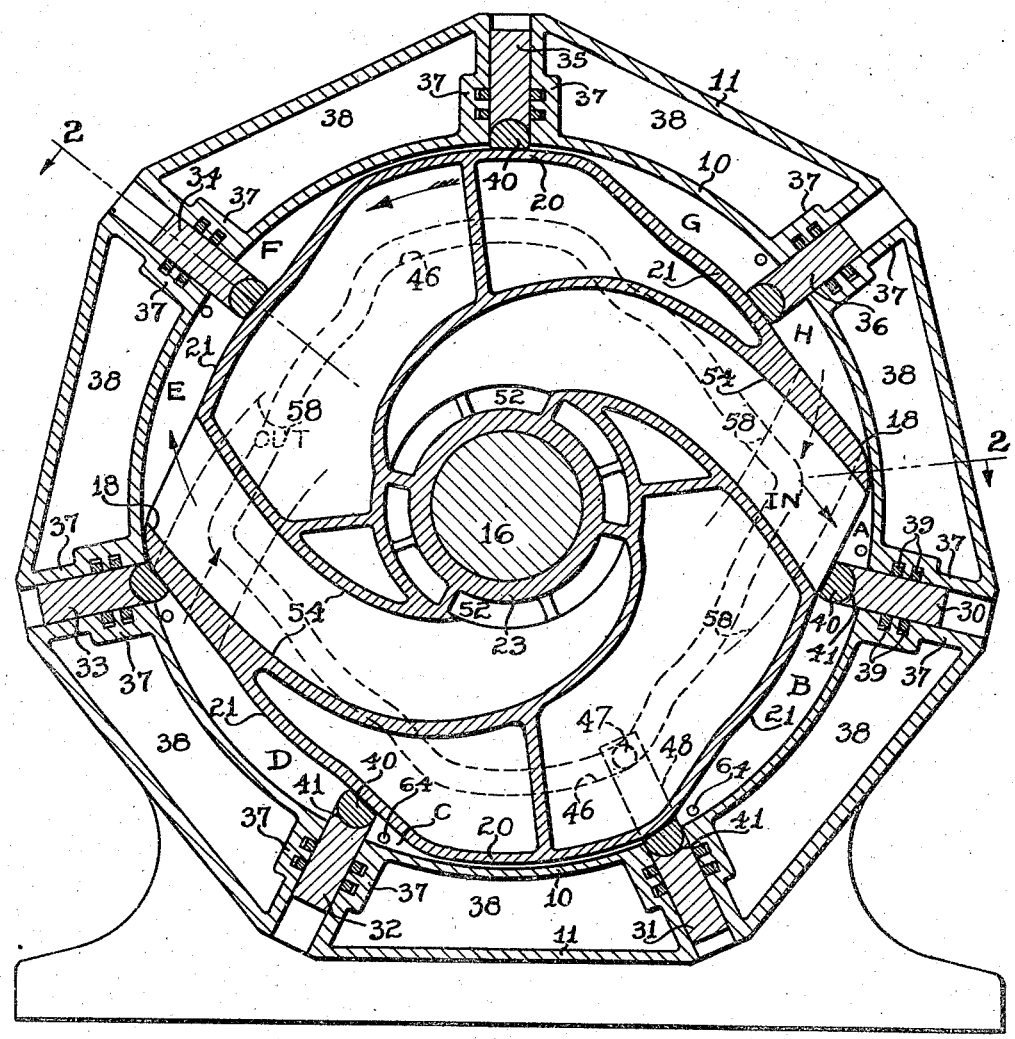
Fig. 1 is a vertical cross section through the motor, taken approximately on the line 1—1 of Fig. 2.

In the embodiment illustrated in the drawings, the stator is shaped as a hollow outer shell having an inner wall 10 providing a cylindrical inner surface and an outer casing wall 11 spaced therefrom. Inner end walls 12 and 13 cooperate with the peripheral wall 10 to form a drum like stator chamber within which the rotor is mounted. Outer end walls 14 and 15 form with the peripheral wall 11 and associated parts a casing arranged to hold a fluid coolant around the inner stator walls. A shaft 16 is suitably supported within bearings 17 on the stator end walls. The rotor is suitably fixed on this shaft and arranged to rotate within the stator.

The rotor is a drum shaped body having its outer peripheral wall shaped to form one, two or more narrow lobes 18 and a like number of wide lobes 20 arranged alternately and which revolve close to the stator wall 10. The two narrow lobes 18 shown in the drawings are arranged to revolve substantially in contact with the interior surface of the wall 10 of the stator, while the lobes 20 are spaced slightly from that inner stator wall. Between the lobes, the peripheral rotor wall 21 is substantially cylindrical, and the radius of each intermediate cylindrical portion 21 is materially less than the radius of the stator wall 10, as shown, so as to provide adequate compression and combustion spaces between the lobes and the adjacent peripheral stator and rotor walls, as well as the associated end walls and the movable abutments. The peripheral surface of each of the narrow lobes 18 is substantially cylindrical and arranged to fit slidingly against the stator wall throughout a substantial radial arc and the entire length of the operative portion of the casing. The wide lobes 20 have outer partially cylindrical faces concentric with the inner stator face. The narrow lobes 18, if there are two in number, may be arranged diametrically opposite, and similarly the wide lobes 20 are opposite each other, so that the centers of the lobe faces are 90° apart.

The parts are suitably constructed for the purposes of assembly. In the assembled form, the rotor has two end walls 22 connected by a hub 23 mounted on the shaft 16 and keyed thereto. Strengthening walls 24 of suitable shapes and constructions are provided and these may be provided with perforations 25 to permit coolant water to circulate therethrough. The end walls 12 and 13 of the stator casing have inner vertical plane faces 26 (Fig. 2) slidably fitting against the outer plane surfaces of the rotor end walls 22, and the stator parts form substantially gas tight end walls for the compression and combustion chambers between the rotor lobes.

A plurality of movable abutments, which are shown in the drawings as slidable vanes, are mounted on the stator casing in such a manner that they may remain substantially in contact with the peripheral surface of the rotor. There are four lobes on the rotor and in order to have the motor fire in a continuing sequence, I prefer that the vanes be in an odd number, such as the seven illustrated in the drawings. These vanes 30, 31, 32, 33, 34, 35 and 36 and their mountings are alike and may be described with reference to vane 30. This vane or abutment is substantially rectangular in both longitudinal and transverse section and it extends the entire distance between the faces 26 of the inner walls of the stator. Each vane makes substantially a sliding contact with the peripheral surface formed by the lobes 18 and 20 and the intermediate surface portions 21 of the rotor. Hence, each two pair of vanes forms with the stator and rotor parts a chamber within which the gas may be compressed or burned.

Figure 6:
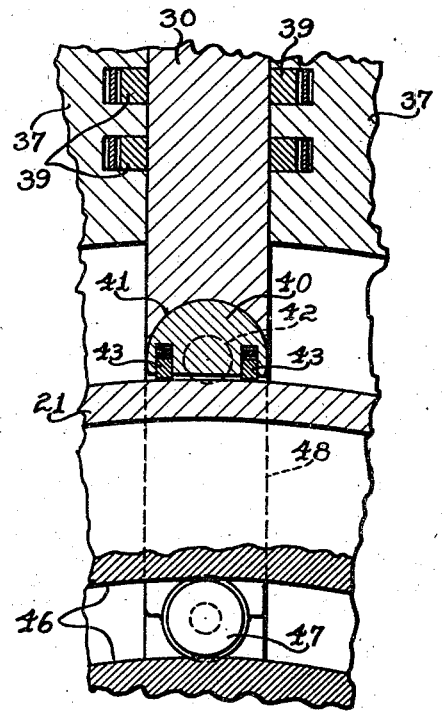
Fig. 6 is a fragmentary sectional detail of a sliding vane and its controlling cam.

Each vane fits slidably between parallel walls 37 arranged preferably substantially parallel with a radial plane of the rotor. These walls 37 connect the inner and outer walls 10 and 11 of the stator and thus form strengthening and supporting ribs therefor. The space therebetween which carries the slide vane may open outwardly to the atmosphere as illustrated. The spaces 38 between the opposed ribs of each pair of adjacent vanes connect with the spaces between the vertical walls 12 and 15 and 13 and 14 and thus form a continuous chamber within the stator through which water may circulate. Suitable spring pressed or resilient sealing strips 39 (Fig. 6) may be mounted within inner grooves of the walls 37 and arranged to contact slidably with the side faces of the vane so as to prevent the leakage of gas past the same. Similarly, suitable spring pressed or resilient seals, such as the seals 43, may be provided for other surfaces of the vanes as required to prevent improper passage of gas to or from the compression and combustion chambers. The constructions and arrangements of such sealing strips may be made as desired.

Since each abutment slide is required to make substantially a sliding contact with the peripheral surface of the rotor and to travel up and down the lobe faces, applicant preferably provides the bottom of each slide with a rocking semi-cylindrical bearing member 40 so arranged as to contact with the rotor substantially perpendicular to or normal to a radial line thereof. This rocker 40 has its inner face suitably shaped, and preferably flat as illustrated, which is arranged to slide readily on the peripheral surface of the rotor. The rocking member 40 fits within a cup shaped bearing 41 in the inner edge face of each slide 30. It may make either a bearing contact with that face or preferably be mounted as illustrated on a pair of pivot pins 42 which position and support the rocker 40 relative to the main body of the slide 30. The contact face of the rocker may have a pair of spring pressed or resilient sealing strips 43 (Fig. 6) which maintain contact with the periphery of the rotor and compensate for any lost motion or improper action on the part of the control cams.

Figure 7:
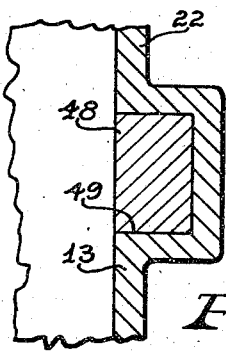
Fig. 7 is a detail of a slide groove and associated arm which moves the vane.

An important feature of this construction lies in the fact that the abutments or sliding vanes are mounted on the stationary casing or stator so that they are not affected by centrifugal force. The vanes are shaped and arranged to make a substantially sliding contact with the outer peripheral wall of the rotor, but in order to minimize friction and yet have the vanes travel properly and always substantially in contact with the rotor, I have mounted each of these vanes so that it may be moved by means of a cam and cam follower. For this purpose, two cams are arranged as rings 46 (Fig. 2) removably secured in grooves in the outer end walls 22 of the water cooled rotor drum by suitable screws. The cams may be shaped to provide grooves so as to control both the in and the out motion of the slide vanes. The face of each of these cam rings is shaped to be substantially concentric with the rotor face or such that the follower riding thereon will move the vanes properly. Each cam ring 46 is made removable so that it may be easily fashioned and properly mounted in place. The cam rollers 47 which ride on the cam path are carried on pivot pins mounted on slidable arms 48 which are connected to the ends of each slide vane. These arms 48 likewise pivotally support the pins 42 of the vane rockers 40 as shown. The outer ends of the pair of arms 48 are secured by screws to the ends of the vane so that the arms and vane form a unit which moves in and out as determined by the shape of the cam. The arm 48 slides in a groove 49 which is formed on the stator wall (Fig. 7) so that gas will not leak past the same.

The cam path is so shaped and arranged that each rocker 40 of the slide vane will travel substantially in contact with the peripheral surface of the rotor, and yet the vane will not have to be moved radially outwardly by the peripheral surface of the rotor lobes. This avoids any substantial friction between the parts and undue wear at a point where the friction would otherwise be high. This is an important feature of the construction, since the abutment vanes are caused to move by accurately shaped cam members arranged outside of the rotor and which are not subjected to the high temperature conditions prevailing within the explosion chambers.

Figure 2:
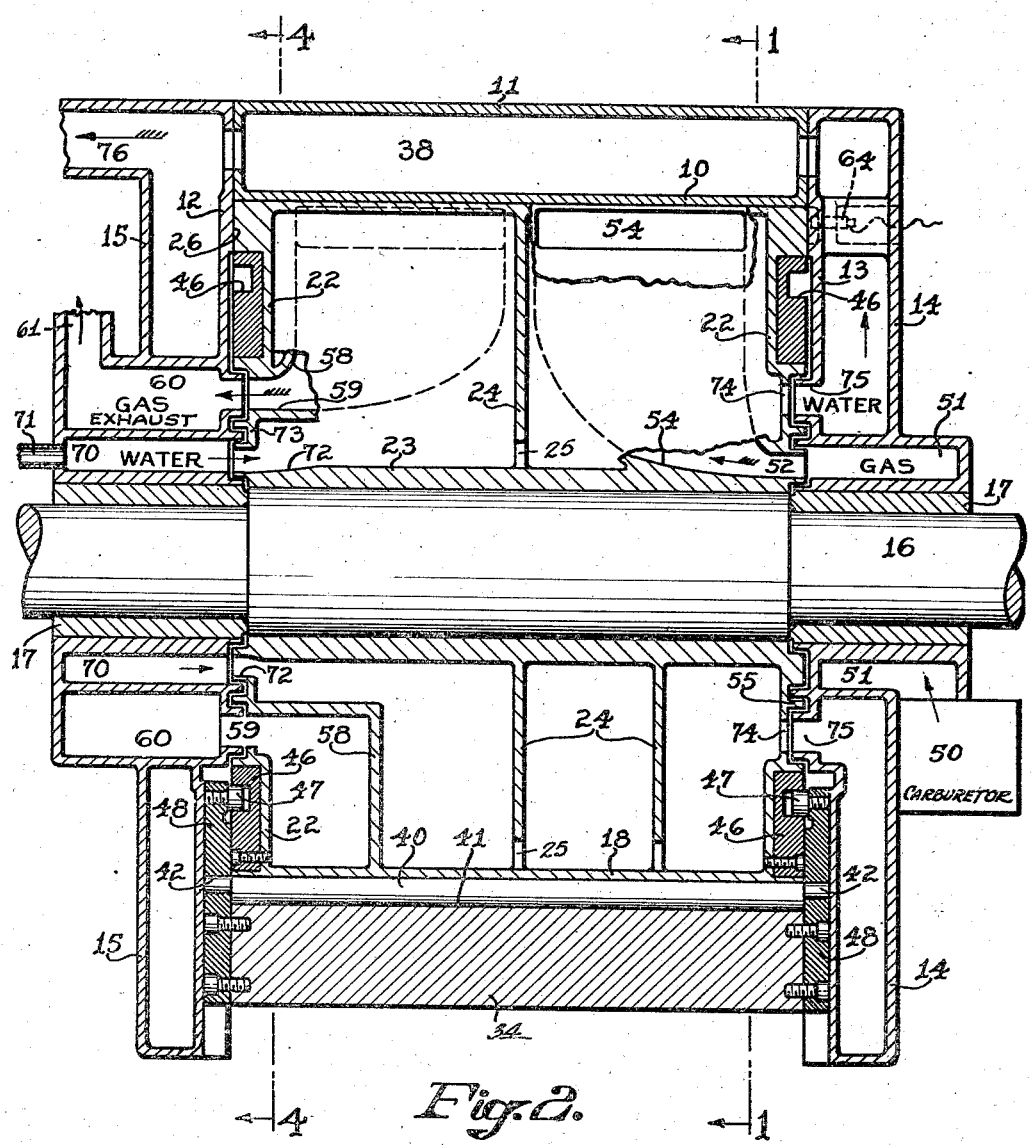
Fig. 2 is a longitudinal sectional view taken approximately on the line 2—2 of Fig. 1.

Another important feature of the invention resides in having the gas inlet and outlet passages arranged within the rotor. The mixture of combustible gas, such as a gasolene and air mixture, is drawn from a suitable carburetor 50 mounted outside of the stator, and into an annular passage 51 at the right hand side of the stator (Fig. 2). Within the rotor and close to its inner hub or bearing shell 23 are two semi-circular intake passages 52 arranged concentrically with the rotor axis which connect with conduits 54 opening through the rotor periphery. Telescoping concentric flanges 55 on the rotor and stator aid in forming a seal, and the parts may be suitably sealed. Each of the intake conduits 54 is shaped as an outwardly expanding, somewhat spirally shaped pipe which opens just at the rear of the narrow lobe 18 of the rotor into the gas chamber between the rotor and stator walls. The pipe 54 also flares laterally so that it extends substantially throughout one-half of the width of the rotor and thus provides a very extensive passage for the quick ingress of combustible gases.

Figure 4:
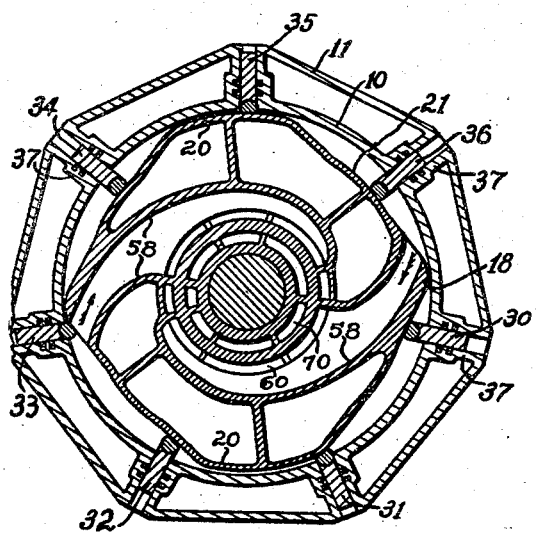
Fig. 4 is a fragmentary section on the line 4—4 of Fig. 2.

The exhaust pipe 58 is similarly fashioned and arranged to communicate with the combustion space throughout the other half of the rotor length, as shown in Figs. 2 and 4. The pipes 54 and 58 are on opposite sides of the central wall of the rotor. The exit pipe 58 communicates with the combustion space in advance of the narrow lobe 18, considering the rotor as traveling counterclockwise or in the direction of the arrow in Fig. 1. There are two inlet pipes 54 and two exit pipes 58 arranged in the opposite halves of the rotor. Each of the exit pipes 58 communicates with a semi-circular passage 59 (Fig. 2) which opens into an annular passage 60 (Fig. 4) in the left hand side of the stator casing. This annular passage 60 communicates through an outlet pipe 61 with the atmosphere. It will be observed that the gas inlet 52 is located as near as possible to the axis of the rotor, so that centrifugal force aids somewhat in introducing the gas into the compression chamber. The exit pipe is shown as opening into the combustion space in such a direction as to form an open ended horn that moves forward and sweeps the gases out of that combustion space after the explosion.

Figure 5:
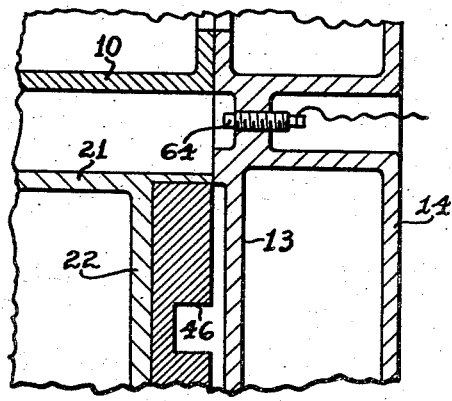
Fig. 5 is a fragmentary sectional detail showing the spark plug and associated explosion chamber.

A set of spark plugs 64, illustrated diagrammatically in the drawings, are arranged in advance of and close to each of the slide vanes 30 to 36 inclusive. Each spark plug is mounted on and projects inwardly through the stator wall 13, so that the spark may be formed in a recess at the inside of the wall 13. A wall 65 connecting between the stator walls 13 and 14 (Fig. 5) forms a pocket which carries the plug and prevents escape of fluid from between the stator walls. This pocket opens to the outside and the spark plug is therefore readily accessible during use of the motor. Each plug is connected with suitable timers and other electrical devices provided for the purpose of establishing a spark momentarily at the spark plug at the proper time for the gas explosition. It will be understood that starting motors and other adjuncts to an internal combustion motor may be used as desired and that their details of construction do not constitute a part of this invention.

Another feature of the invention resides in cooling both the stator and the rotor by means of a coolant fluid held in chambers arranged to withdraw the heat directly from the stator wall 10, the rotor periphery and their associated parts. For this purpose, an annular fluid passage 70 communicating with a suitable supply pipe 71 (Fig. 2) is arranged at the left hand side of the stator casing just outside of the bearings. This annular chamber 70 communicates with the interior of the rotor through an annular passage 72, and suitable telescoping, interfitting or sealing parts 73 on the stator and the rotor may be provided to prevent leakage. A fluid coolant, such as water, may be circulated from an outside supply through the rotor and stator. It passes through holes 25 in the supporting wall 24 and associated parts and ultimately escapes through a substantially annular passage 74 (Fig. 2) into an annular passage 75 formed in the inner side wall 13 of the stator. Thence the water circulates through the stator casing and ultimately reaches an outlet passage 76 through which it leaves the motor. The inlet port 72 is nearer to the rotor axis than is the outlet port 74, the preferred arrangement being as shown in the drawings. It will be appreciated that suitable packing or glands or other desired seals may be provided to insure that the fluid coolant does not escape into the gas combustion spaces or leak from the machine.

Figure 3:
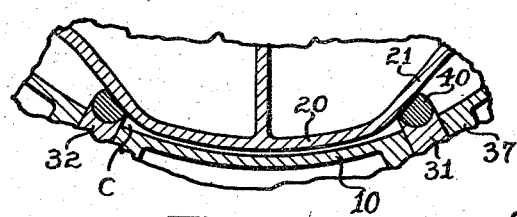
Fig. 3 is a fragmentary detail of the lower part of Fig. 1, with the rotor in a position of maximum gas compression.

Each wide lobe 20 has its outer surface of such dimensions, or the vanes are so spaced, that the cylindrical portion of the lobe surface subtends a smaller arc than the distance between the opposed faces of two adjacent vanes. Hence, as shown at the bottom of Fig. 1 and in Fig. 3, there is always a space of material volume in advance of or at the rear of the lobe which will hold the compressed gas. That is, the gas is compressed between the forward face of the lobe 20 and the rear face of the adjacent vane or abutment 30, 31, etc., on the stator, and the compressed gas (Fig. 3) will fill the space between the vanes and the cylindrical portion of the lobe and the adjacent concentric portion of the stator casing 10. Then, as the lobe moves forward from the position of Fig. 3 to that of Fig. 1, the gas passes to the rear of the lobe into the space C where it is available for the firing step. These parts may be so shaped and proportioned that the gas has its maximum compression when the parts are in the position of Fig. 3 and the gas is not permitted to expand materially before it is moved into the combustion space C. This condition may be obtained if the volume of the final compression space remains constant or even decreases slightly while the forward face of the lobe 20 is passing beneath the adjacent vane and is forcing the major portion of the gas to pass to the rear of the lobe.

The operation of the motor will be apparent by considering the conditions in each of the compartment spaces A, B, C, D, E, F, G and H, viewing them progressively in a clockwise sequence. The rotor lobes, the vanes and the inlet and exhaust passages 54 and 58 are so arranged that when the rotor turns in a counterclockwise direction, as shown by the arrow in Fig. 1, the combustible mixture of gasolene and air will enter through each inlet 54 and be drawn into the space between the lobe 18, the adjacent vane in the rear of the lobe and the spaced stator and rotor surfaces. This serves to fill each compartment space in serial order. Likewise, each outlet pipe 59 is serially sweeping out the burned gases as it revolves from one compartment to another. Considering the right hand inlet pipe 54 of Fig. 1, the gas enters the space A in the rear of the lobe 18 and gradually fills the space between vanes 30 and 36. The condition in that compartment is then the same as in compartment B between vanes 30 and 31. Then the wide compressor lobe 20 moves up to compress the gas against the rear face of the next vane in advance. An intermediate compression condition is shown in space F. The gas enters the narrow space between the lobe 20 and the outer wall 10, and the gas passes over that wide lobe into the space C in the rear thereof. When the lobe 20 has reached the vane 31 then the gas is fired in the chamber C by means of the spark plug 64, and the sudden expansion of the burning gases gives a propelling force against the rear of the wide lobe 20 and turns the rotor in a counterclockwise direction. Then one of the outlet passages 58 moves forward into position, as shown in space D, and as its opening passes beneath the vane 33 the gaseous products of combustion are swept out through that spiral exhaust passage. Then the cycle is repeated as shown in spaces E, F, G and H. In Fig. 1, space E is being filled; space F is under compression; firing is taking place in space G; and space H is having the fired gases removed. Since there is an odd number of slide vanes and an even number of compression and explosion lobes, the compression and explosion impulses take place in a sequence progressively around the motor and the explosion impulses occurring at the opposite sides of the rotor provide nearly balanced forces. That is, there are 7 spark plugs 64 arranged in advance of the slide vanes and there are two sets of compression and explosion lobes, so that there will be 14 explosion impulses for each complete rotation of the rotor. The spark plugs and the associated electrical devices are so timed that the plugs will fire serially when the gas has been swept from the space in front of the wide lobe 20 into the space in the rear thereof, as is found in spaces C and G.

The slide vanes are moved in proper sequence by the connected cam followers 47 as the rotor and its cam rings 46 revolve, so that the vanes make only a light contact with the rotor. The rocker strips 40 are rocked in their bearing sockets as required by the shape and directional movement of that portion of the rotor periphery passing therebeneath. This provides a better gas seal and minimizes the friction and wear of the parts.

Since the cooling water enters the rotor through an inlet 72 which is nearer the axis of the rotor than is the exit port 74, centrifugal force aids in circulating the water. The relative positions of these ports in the rapidly revolving rotor may be varied as desired to give a required volume flow of water through the motor; and valves and other circulation control devices may be provided.

It will also be understood that a suitable starting motor may be connected to the shaft 16 to initiate the motor cycle. A throttle control may be provided to control the volume of explosive or combustion gas mixture to be introduced to the motor compartments and thus control the power output and the motor speed. Various constructional features may be incorporated in the motor as will be readily apparent to one skilled in the art. Likewise, equivalent constructional features may be substituted for those above described. Hence the drawings and description thereof are to be interpreted as illustrating the general principles of the invention and a preferred constructional embodiment and not as limitations on the claims appended hereto.

I claim:

1. An internal combustion motor comprising a stator having end walls and a substantially cylindrical internal surface, a rotor revoluble therein having its periphery shaped to form a narrow lobe revoluble in contact with said surface and a wide lobe having a peripheral face portion revoluble close to but slightly spaced from said surface, walls within the rotor forming a gas inlet and a gas outlet opening respectively at the rear and in front of the narrow lobe, a set of abutments movably mounted on the stator and forming with the lobes and the associated stator parts a sequence of gas loading, compression, firing and exhaust spaces, means to hold each of the abutments continuously in contact with the rotor periphery and prevent the movement of gas past the abutment, said abutments being spaced about the rotor by distances greater than the arc subtended by the face portion of the wide lobe, and the wide lobe and abutments being so arranged that gas may be compressed by the wide lobe and transferred under substantial compression into a small firing space at the rear of the lobe, and means for firing the compressed gas periodically in said firing space.

2. An internal combustion motor comprising a stator having end walls and a substantially cylindrical internal surface, a rotor revoluble therein having its periphery shaped to form a plurality of narrow lobes revoluble in contact with said surface and arranged alternately with wide lobes which have similar peripheral face portions revoluble close to but slightly spaced from said surface, walls within the rotor forming a gas inlet face, walls within the rotor forming a gas inlet and a gas outlet opening respectively at the rear and in front of the narrow lobe, a set of abutments movably mounted on the stator and forming with the lobes and the associated rotor and stator parts a sequence of gas loading, compression, firing and exhaust spaces, means to hold each of the abutments continuously in contact with the rotor periphery and prevent the movement of gas past the abutment, said abutments being spaced about the rotor by distances greater than the arc subtended by the face portion of the wide lobe, and each wide lobe and the abutments being so arranged that gas may be transferred under substantial compression into a firing space at the rear of the lobe, and means for firing the compressed gas successively in the firing spaces, including a set of spark plugs mounted on the stator and accessible from the outside thereof, one plug being located close to and forward of each of said abutments, so that the gas may be fired in any desired timing relative to its state of compression.

3. An internal combustion motor comprising a stator having end walls and a substantially cylindrical internal surface, a rotor revoluble therein having its periphery shaped to form a narrow lobe revoluble in contact with said surface and a wide lobe having a peripheral face portion revoluble close to but slightly spaced from said surface, walls within the rotor forming a gas inlet and a gas outlet opening respectively at the rear and in front of the narrow lobe, a set of abutments movably mounted on the stator and arranged to form with the stator and rotor parts a series of gas spaces, means to hold each of the abutments continuously in contact with the rotor periphery and prevent the gas from moving past the abutment, said abutments being spaced about the rotor by a greater distance than the arc subtended by said face portion of the wide lobe, and the wide lobe and abutments being so arranged that gas may be compressed by the wide lobe and transferred under substantial compression to the rear thereof, walls forming a water chamber within the stator for cooling said cylindrical surface, walls within the rotor defining a water chamber adjacent to and cooling the rotor periphery, means providing inlet, outlet and connecting passages for circulating water serially through said cooling chambers, the outlet passage from the rotor chamber being spaced at a greater radial distance from the rotor axis than is the inlet thereto so that centrifugal force aids in circulating the water, and means for firing the compressed gas periodically.

4. An internal combustion motor comprising a stator having end walls and a cylindrical internal surface, a rotor revoluble therein having end walls and a periphery shaped to form narrow lobes revoluble in contact with said surface and arranged alternately with a plurality of wide lobes having similar peripheral face portions revoluble close to but slightly spaced from said surface, abutments movably mounted on the stator, means to hold each of the abutments continuously in contact with the rotor periphery and prevent the movement of gas past the abutment, said abutments being evenly spaced about the rotor by distances slightly greater than the arc subtended by said face portion of the wide lobe and the wide lobes and abutments being so arranged that gas may be compressed and then transferred to the rear of the lobe under a substantial compression, means including a set of spark plugs mounted on the stator closely adjacent to and in front of each abutment for firing the compressed gas, walls forming gas inlet passages opening through the rotor periphery near one end of the rotor and at the rear of each narrow lobe, and walls forming gas outlet passages opening through the rotor periphery near the opposite end thereof and in front of each narrow lobe.

5. An internal combustion motor comprising a stator having hollow walls forming a cooling fluid chamber around a cylindrical internal surface, a rotor mounted therein which has a periphery shaped to form narrow lobes revoluble in contact with said surface and arranged alternately with wide lobes having similar peripheral face portions revoluble close to but slightly spaced from said surface, an odd number of abutments movably mounted on the stator, means to hold each of the abutments continuously in contact with the rotor periphery and prevent the movement of gas past the abutment, said abutments and wide lobes being arranged to compress the gas periodically and transfer it under substantial compression to the rear of the wide lobe, walls at one end of the stator providing a gas inlet chamber, walls at one end of the stator providing a gas outlet chamber, walls in the rotor forming passages opening through the rotor periphery which connect said chambers respectively with the spaces at the rear of and in front of each narrow lobe, walls on the stator forming water inlet and outlet passages, walls in the rotor forming a water container communicating with said water passages, and means including a set of spark plugs accessibly mounted on the stator closely adjacent to and in front of each abutment for firing the compressed gas.

6. An internal combustion motor comprising a stator having end walls and a substantially cylindrical internal surface, a rotor revoluble therein having its periphery shaped to form a narrow lobe revoluble in contact with said surface and a wide lobe having a peripheral face portion revoluble close to but slightly spaced from said surface, walls within the rotor forming a gas inlet and a gas outlet opening respectively at the rear and in front of the narrow lobe, a set of abutments movably mounted on the stator and forming with the lobes and associated stator parts a series of gas spaces, a cam track at each end of and revoluble with the rotor which is located inwardly of and remote from said gas spaces, cam followers guided by said track, inwardly extending arms on the abutments carrying the followers, said cam and associated parts being shaped and arranged to hold the abutments continuously in contact with the rotor periphery, said abutments and wide lobes being arranged to compress the gas and transfer it under substantial compression to a space at the rear of the wide lobe, and means for firing the compressed gas, including a set of spark plugs mounted on the stator and accessible from the outside thereof, one plug being located close to and forward of each of said abutments.

STANLEY J. POVER.